No. 690,899. Patented Jan. 7, 1902.
J. G. SMITH.
CELERY HARVESTING IMPLEMENT.
(Application filed June 18, 1901.)
(No Model.)
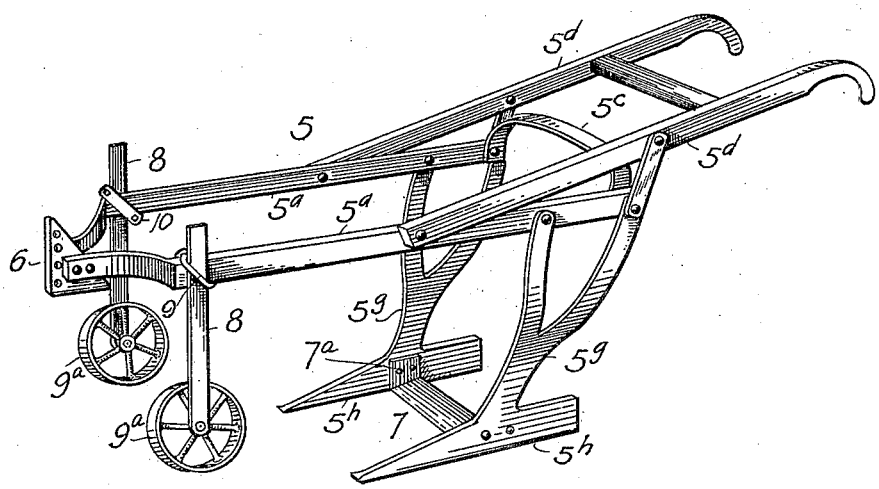
FIG. 1
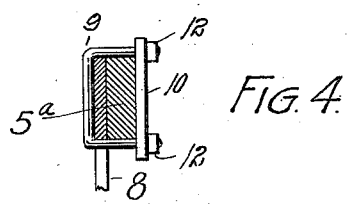
FIG. 4.
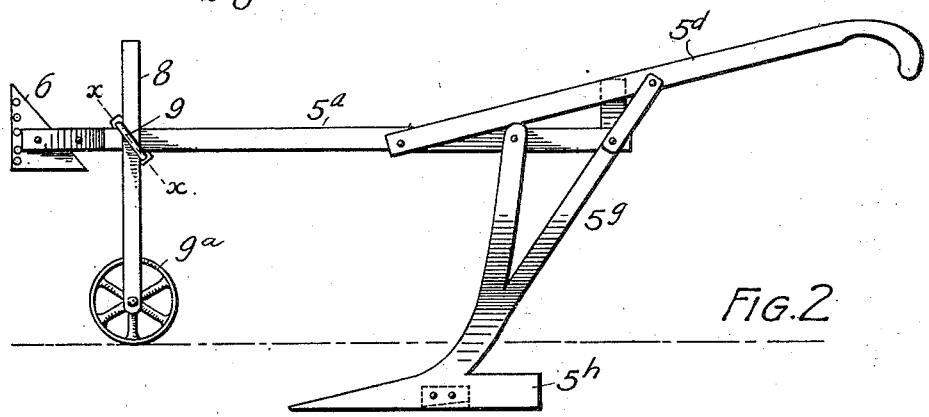
FIG. 2.
FIG. 3.
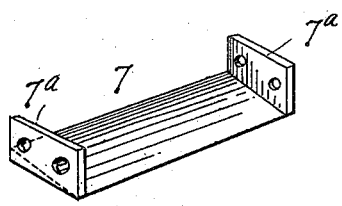
WITNESSES:
INVENTOR.
John Guy Smith
ATTORNEY.

United States Patent Office.

JOHN GUY SMITH, OF DENVER, COLORADO, ASSIGNOR OF ONE-HALF TO FRANK M. IRISH.

CELERY-HARVESTING IMPLEMENT.

SPECIFICATION forming part of Letters Patent No. 690,899, dated January 7, 1902.

Application filed June 18, 1901. Serial No. 65,040. (No model.)

*To all whom it may concern:*

Be it known that I, JOHN GUY SMITH, a citizen of the United States of America, residing at Denver, in the county of Arapahoe and State of Colorado, have invented certain new and useful Improvements in Celery-Harvesting Implements; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in implements for use in gathering or harvesting celery, my special object being to greatly facilitate the work and lessen the cost of gathering the aforesaid article. It is believed, however, that my improved implement may be employed to advantage in gathering vegetables and food roots of various kinds. The apparatus will, however, be described in this specification with special reference to what I consider its chief use—namely, for cutting the roots of celery, so that the bunches may be picked out of the ground without effort. Heretofore so far as I am aware celery has been dug by hand. My improved implement is drawn by horses, a knife extending transversely to the ridge or row being employed to pass beneath the edible part of the article and cut the roots. This knife is mounted on a suitable frame. The invention will be hereinafter described more fully and in detail, reference being made to the accompanying drawings, in which is illustrated an embodiment of the invention.

In the drawings, Figure 1 is a perspective view of my improved implement. Fig. 2 is a side elevation of the same. Fig. 3 is a perspective view of the knife shown in detail and on a larger scale. Fig. 4 is a section taken on the line $x$ $x$, Fig. 2, the parts being shown on a larger scale.

The same reference characters indicate the same parts in all the views.

Let the numeral 5 designate the framework as a whole. The construction of the framework shown in the drawings is suitable for the purpose, though it must be understood that any other suitable construction may be employed. As shown, there are two upper bars $5^a$, connected by a brace $5^c$ at the rear. These bars are parallel a greater part of their length; but their forward extremities are made to approach each other and form a support for a clevis 6, suitable for the attachment of a doubletree. To the bars $5^a$, about midway of their parallel length, are attached the forward extremities of rearwardly-extending handle-bars $5^d$. To these bars $5^a$ and $5^d$ are attached two depending bars $5^g$, whose upper portions are bifurcated and whose lower extremities merge into runners $5^h$. In use the runner-bars are adapted to straddle a row of celery. The cutter 7 extends between the runners, its extremities being attached to them on the inside. The knife or cutter, as shown in the drawings, is formed with end flanges $7^a$, bent at right angles and secured to the runners by suitable fastening devices. The face of the knife is beveled downwardly from the rear toward the front, where it is provided with a suitable thin cutting edge.

To the forward extremities of the bars $5^a$ are adjustably attached two vertical bars 8, to whose lower extremities are journaled wheels $9^a$. The position of the wheels determines the depth to which the knife runs when the implement is in use. The vertical bars 8 are connected to the parts $5^a$ of the frame by means of a clamp composed of a U-shaped part 9 and a metal plate 10, having openings through which the extremities of the U-shaped part pass. The extremities of the part 9 are secured by nuts 12. By loosening these nuts it is evident that each bar 8 may be vertically adjusted as desired.

The cutter 7 is detachably connected with the runners $5^h$ by means of bolts or other suitable fastening devices, as heretofore stated, allowing the knife to be readily detached for sharpening purposes.

As is well known, celery is grown in longitudinal mounds or ridges. In use the implement straddles this ridge or row, and the knife runs far enough below the top to cut the roots, after which the bunches are perfectly loose and may be picked out of the ground and gathered without the effort of digging.

Having thus described my invention, what I claim is—

1. In an implement for harvesting celery, the combination with a suitable frame, of depending bars located on opposite sides of the frame and attached thereto, said bars terminating in integral parallel runners suitably separated and extending in the direction of the line of travel, and a knife whose extremities are respectively attached to the bars and arranged to extend transversely to the direction of travel, and pass beneath the ground at a suitable depth to cut the roots of the celery.

2. In an implement of the class described, the combination with an upper framework, of two depending bars one on each side, said bars being attached to the framework, runners connected with the lower extremities of the bars, said runners being parallel with each other, and extending in the direction of the line of travel, a transverse knife connecting the runners which extend both forward and back from the knife extremities, and wheels for regulating the depth of the knife below the surface, said wheels being vertically adjustable for the purpose set forth.

In testimony whereof I affix my signature in presence of two witnesses.

JOHN GUY SMITH.

Witnesses:
 DORA C. SHICK,
 A. J. O'BRIEN.